I. M. ROSE.
COMBINED FOUNTS AND BRUSHES FOR LIQUIDS.
No. 173,064. Patented Feb. 1, 1876.
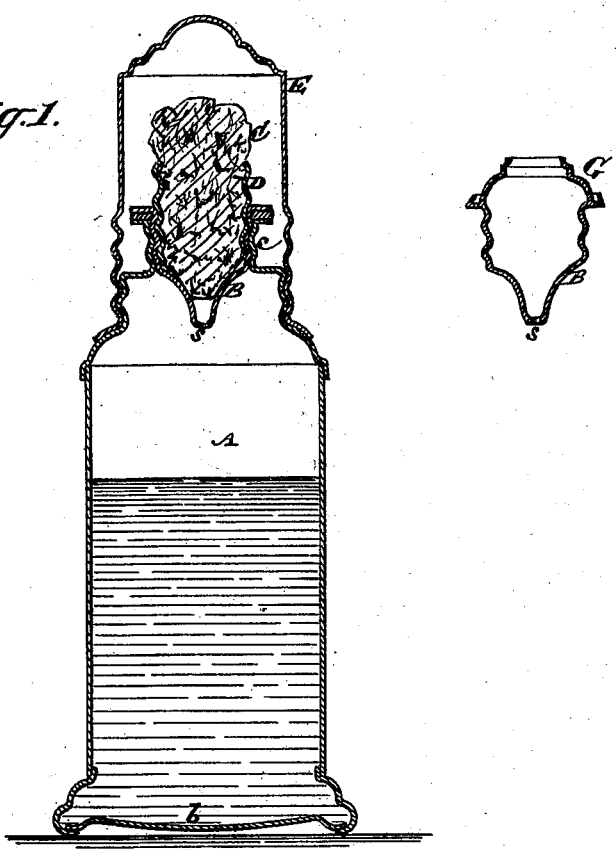
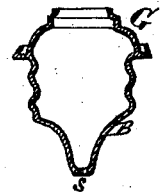
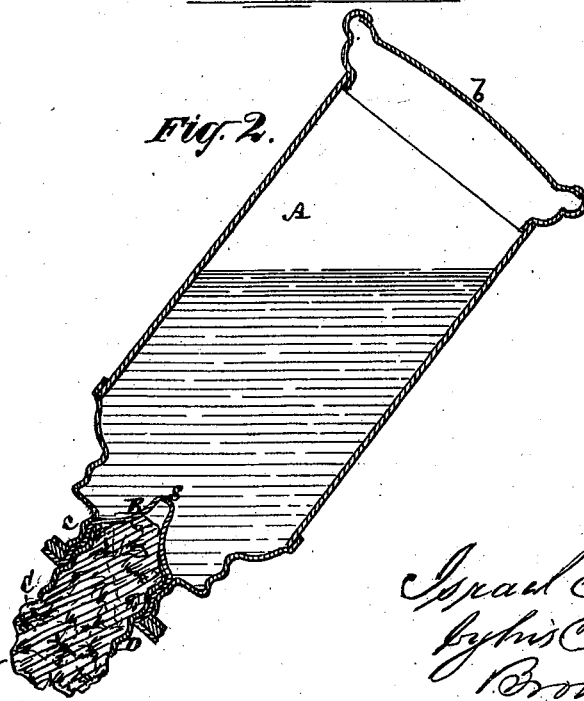

UNITED STATES PATENT OFFICE.

ISRAEL M. ROSE, OF BROOK HAVEN, ASSIGNOR TO PATRICK H. DRAKE AND WILLIAM P. WARD, OF NEW YORK, N. Y.

IMPROVEMENT IN COMBINED FOUNTS AND BRUSHES FOR LIQUIDS.

Specification forming part of Letters Patent No. 173,064, dated February 1, 1876; application filed December 30, 1875.

*To all whom it may concern:*

Be it known that I, ISRAEL M. ROSE, of Brook Haven, in the county of Suffolk and State of New York, have invented certain new and useful Improvements in Combined Founts and Brushes for Liquids; and I do hereby declare that the following is a full, clear, and exact description of the same, reference being had to the accompanying drawing, which forms part of this specification.

This invention relates to hand devices for applying polishing and other liquids—as, for instance, polishing liquids or solutions to boots and shoes, black lead or polishing solutions to stoves, oil to harness, and ink or other marking solution to stencil-plates, without the user's hand coming in contact with such liquids or solutions, many of which are either objectionably odorous or have a soiling effect.

My improvement consists in a fount or liquid-container, having combined with it a conical distributer, the apex of which is arranged to project toward or within the container, and away from the sponge, pad, or other absorbent on the reverse side of the conical distributer, or within the latter, whereby a most thorough distribution of the liquid or solution over the sponge, brush, or pad is effected, and choking of the cone or distributer by sediment or dirt is prevented. The invention also consists in a combination, with said conical distributer, of a screw or adjustable holder of the sponge, brush, or pad, whereby the latter may be adjusted into any desired proximity with the surface of the cone, which serves to spread or distribute the liquid or solution over the inner end or surface of the sponge, brush, or pad. The invention also consists in various divisions or subdivisions of these several features, and in certain combinations and peculiarities of construction connected therewith.

Figure 1 represents a vertical or longitudinal section of my improved combined fount and pad, with a screw cap or cover applied to the pad end of the device when not in use. Fig. 2 is a longitudinal section of said combined fount and pad when in use and having the screw-cap removed.

A is the fount, or liquid or solution container, made of any suitable material, and either of cylindrical or other form, but of a size which will admit of its being conveniently grasped by the hand. A simple bottle would answer, but I prefer to use a metal can having a spring-bottom, $b$, to provide for the ejection, as in certain oil-cans, of the liquid or solution from within the container. The opposite end of said container has an open neck or mouth, $c$, which may either be fitted with a cork or stopper, and the conical distributer hereinafter described be fitted within the stopper, which may be made tubular for the purpose, or said distributer with its contained sponge, brush, or pad may be constructed to form the stopper, which may either be a screw or plain one. The following construction, however, is preferred: Thus B is the conical distributer, made of metal and constructed to screw into the neck $c$ of the fount till an outer flange on the distributer comes down on a flange of the neck $c$, or on an interposed packing. This conical distributer is hollow to receive and hold within it the sponge, brush, or pad C, by which the liquid or solution is applied when using the instrument, and it is a peculiarity of my invention that the apex of this conical distributer is arranged to project toward or within the fount or container A and away from the sponge or pad C. This not only prevents the orifice $s$ of the conical distributer from becoming choked with sediment or dirt by reason of the ready clearance which such an arrangement of the cone presents, but the liquid or solution will be thoroughly spread over the whole inner end or surface of the sponge, brush, or pad, and the latter be kept freely or permanently moist.

The sponge, brush, or pad C might be fitted directly within the conical distributer B, but it is preferred to insert it in an independent holder, which in its turn is fitted within said distributer. It is also desirable to make such sponge, brush, or pad holder adjustable within the distributer in order that the inner end or surface of the sponge, brush, or pad may be set from time to time, as required, into the necessary proximity with the inner surface of the conical distributer, and by varying its pressure on or contact with the latter the flow of the liquid or solution through the sponge, brush, or pad is regulated. To these ends the sponge, brush, or pad C is fitted within and through an adjustable or screw holder D, which in its turn fits the screw-thread or interior of the upper extended portion of the conical distributer.

To use such combined fount and sponge, brush, or pad, the container A is grasped by the hand and the liquid ejected from it to saturate the sponge, brush, or pad by pressing with the thumb on the elastic bottom $b$, and then manipulating the whole device to apply the liquid or solution absorbed by the sponge, brush, or pad to the object or surface required to be polished or smeared.

By fitting the pad end of the article with a screw-cap, E, the whole device, charged with liquid for use, as required, may be put in the pocket or be packed away in a trunk or valise without detriment or annoyance by breakage.

To the right hand of Fig. 1 is shown a modification of the conical distributer B, formed or provided with a conical cap or outer retainer G of the sponge, brush, or pad, which projects through said holding-cap, thus dispensing with a separate inner and adjustable sponge, brush, or pad holder.

I claim—

1. The combination, with the sponge, brush, or pad C, of the hollow conical distributer B, constructed to receive said sponge, brush, or pad within it, and so that the perforated apex of the cone projects away from the sponge, brush, or pads, substantially as specified.

2. The combination with the fount or container A, of the hollow conical distributer B, constructed to receive the sponge, brush, or pad C within it, and with the apex of the cone arranged to project toward or within the container, essentially as described.

3. The adjustable sponge, brush, or pad holder D, in combination with the hollow conical distributer B, substantially as and for the purposes herein set forth.

4. The combination, with the screw-neck $c$ of the fount, of the conical distributer B, constructed to screw within said neck, and the sponge, brush, or pad holder D, constructed to screw within the conical distributer, essentially as described.

I. M. ROSE.

Witnesses:
 HENRY T. BROWN,
 BENJAMIN W. HOFFMAN.